United States Patent [19]
Hespelt

[11] Patent Number: 6,053,553
[45] Date of Patent: Apr. 25, 2000

[54] DEVICE FOR VARIABLE SUBDIVISION OF A STORAGE AREA

[75] Inventor: Achim Hespelt, Spiegelberg, Germany

[73] Assignee: DaimlerChrysler AG, Germany

[21] Appl. No.: 09/042,562

[22] Filed: Mar. 17, 1998

[30] Foreign Application Priority Data

Mar. 17, 1997 [DE] Germany ............................ 197 11 035

[51] Int. Cl.$^7$ ................................ B60R 5/00; B60N 3/12
[52] U.S. Cl. ...................... 296/37.1; 296/37.5; 296/37.6; 296/37.8
[58] Field of Search ................................ 296/37.5, 37.1, 296/37.6, 37.8, 37.14; 410/130, 132, 139, 142; 224/404, 539, 42.34

[56] References Cited

U.S. PATENT DOCUMENTS

| | | | |
|---|---|---|---|
| 4,278,376 | 7/1981 | Hunter | 410/130 |
| 4,718,584 | 1/1988 | Schoeny | 296/37.5 |
| 5,340,183 | 8/1994 | Horian | 296/37.5 |
| 5,570,921 | 11/1996 | Brooker | 296/39.1 |
| 5,597,193 | 1/1997 | Conner | 296/37.6 |
| 5,762,245 | 6/1998 | Hurst | 224/331 |

FOREIGN PATENT DOCUMENTS

| | | |
|---|---|---|
| 711274 U1 | 4/1971 | Germany . |
| 3629283C2 | 4/1989 | Germany . |
| 4015556A1 | 11/1990 | Germany . |

Primary Examiner—D. Glenn Dayoan
Assistant Examiner—Lori L. Coletta
Attorney, Agent, or Firm—Evenson, McKeown, Edwards and Lenahan, P.L.L.C.

[57] ABSTRACT

A device for variable subdivision of a storage compartment, especially a trunk in an automobile, has partitions projecting upward from the storage compartment floor and connected with one another with articulation. Two of the partitions are articulated endwise to a storage compartment wall projecting vertically from the storage compartment floor and one partition is displaceable approximately at right angles to the storage compartment wall. To improve the functionality of the device so that it retains its selected spatial division reliably in all extended positions and remains safely secured to the storage compartment floor, a locking device is provided. The locking device acts between the displaceable partition and the floor of the storage compartment. The locking device has a lock on the partition side that is displaceably secured and operated manually, as well as a plurality of locking receptacles arranged in the displacement direction in a row in the floor of the storage compartment.

20 Claims, 4 Drawing Sheets

DEVICE FOR VARIABLE SUBDIVISION OF A STORAGE AREA

BACKGROUND AND SUMMARY OF THE INVENTION

This application claims the priority of German application 197 11 035.5-21, filed in Germany on Mar. 17, 1997, the disclosure of which is expressly incorporated by reference herein.

The invention relates to a device for variable subdivision of a storage area, especially a trunk of an automobile, with partitions projecting from the floor of the storage compartment and connected with one another with articulation, with two of said partitions being articulated at their free ends to a storage compartment wall that projects vertically upward from the floor of the storage compartment and with one partition being displaceable approximately at right angles to the wall of the storage compartment.

In the large spacious storage areas of transport vehicles, for example in the trunks of automobiles, such devices serve to prevent smaller or individual items of luggage or objects from tumbling around. Such devices are especially advantageous for transporting paper bags, bottles, plastic sacks, shopping bags, etc. used for daily shopping which must not fall over or roll around if possible when being transported.

In a known device of this type (German Patent Document DE 71 12 747 U1) a folding box consisting of a frame with cloth or netting stretched over it is mounted on the side wall of the trunk of an automobile. The frame can be folded up by means of two joints located on the sides of the frame and stored against the interior of the trunk wall. A clamp holds the folded frame against the inside wall. The joints on the sides of the frame are made with locking screws to secure the frame in any extended position by tightening the joints, so that the capacity of the folding box can be adapted to the current need. However, the locking screws cannot prevent the folding box, especially when fully extended, from lifting partially off the floor of the trunk during extreme vehicle acceleration or when rounding a curve, so that flat objects can slip under the partitions and slide around freely in the rest of the trunk space as before. This is even more likely to occur as a result of insufficient tightening of the locking screws in the two outer joints.

In a likewise known device of this type (German Patent Document DE 36 29 283 C2) the forward displaceable partition is divided into two separate partitions disconnected from one another, and all of the partitions can be locked at angles to one another, for which purpose all of the vertical axes between the partitions are provided with locking devices that secure the partitions to one another. The last partition in each of the two chains of partitions is mounted endwise to rotate around a vertical axis at the rear trunk wall. In this case, likewise by adjusting the angular positions of the partitions, the space delimited by the partitions can be adapted to the volume of the objects to be secured, so that these objects have no space in which to slide or fall over and thus are secured relatively reliably. The same problems as described above occur in this case also.

It is known from German Patent Document DE 40 15 556 A1 that partitions can be secured pivotably to the trunk floor to avoid lifting of the partitions during vehicle acceleration, but narrow limits are imposed on usability.

An object of the invention is to improve a device of the species recited at the outset in such fashion that it retains the specified spatial division in all extended positions and remains securely attached to the trunk floor.

This object is achieved in a device for variable subdivision of a storage compartment of the genera type referred to above, wherein a locking device is provided that operates between a displaceable partition and the floor of the storage compartment, said locking device having a manually operable lock mounted on the displaceable partition and a plurality of locking receptacles arranged in a row in a displacement direction in a storage compartment floor covering.

The device according to the invention has the advantage that the locking device between the front displaceable partition and the trunk floor anchors the front partition securely to the trunk floor in every adjustment position and therefore the articulated connections secure the other partitions against shifting, sliding, or lifting off the floor of the storage compartment. The locking device is simple and can be operated with limited expenditure of force and does not require locking forces as high as those of the locking screws in the known device, which cannot be tightened by certain persons. The device according to the invention, in its folded non-use state, has only a limited packet thickness and can be stored against the wall of the storage compartment without a significant interfering thickness that would adversely affect the use of the complete storage area or prevent its use. The locking device is also operable when the device is in the non-use state and folded against the wall of the storage compartment, so that no special locking clamps or other retaining means need be provided to secure the device against the wall of the storage compartment.

Advantageous embodiments of the device according to the invention with advantageous improvements therein as well as improvements on the invention are described herein.

According to one advantageous embodiment of the invention, the latch of the locking device has at least one locking pin and the plurality of latching receptacles arranged in a row is in the form of at least one row of holes for shapewise insertion of the at least one locking pin, said pin traversing the storage compartment centrally approximately at right angles to the wall of the storage compartment. Such a design of the latching device is very simple in construction and can be produced at low manufacturing cost.

According to one preferred embodiment of the invention, a guide rail is provided in the floor of the storage compartment, said rail extending parallel to the at least one row of holes, and a guide member that engages the guide rail is provided on the displaceable partition. Preferably the guide rail has at least one shoulder extending lengthwise and projecting transversely, said shoulder fitting over the guide member on its upper side that faces away from the floor of the storage compartment, at least partially with guided play. The guide rail not only facilitates the engagement of the at least one locking pin in the locking hole provided in the respective extended position of the displaceable partition, but its reliable attachment to the floor of the storage compartment is ensured over the entire displacement path of the partition, something which otherwise could only be achieved with an extremely long locking pin. The overlapping shoulder, allows the partition to be coupled at all times with the storage compartment floor by means of the guide member and relatively limited insertion of the locking pin into the locking hole is sufficient to ensure against lengthwise displacement, increasing the operating speed of the latching device for releasing and locking the partition.

According to one advantageous feature of preferred embodiments of the invention, the articulated connections between the partitions of the hinge joints are formed by hinge axes directed approximately at right angles to the floor of the storage compartment. These hinge joints contribute significantly to the improvement of the rigidity of the device when extended.

According to another advantageous feature of preferred embodiments of the invention, at least two partitions are provided between each side end of the displaceable partition and the floor of the storage compartment, and are connected with one another with articulation. The number of lateral partitions can be adapted to the space available at the storage compartment wall for lowering the lateral partitions. With a plurality of lateral partitions, the device can also be used in storage compartments that extend transversely with respect to the wall of the storage compartment.

According to other advantageous features of preferred embodiments of the invention, the device according to the invention is installed especially advantageously in the trunks of automobiles, with the device being attached with articulation to the rear wall of the trunk or lining covering said wall. The displaceable partition then runs parallel to the rear wall and extends over the entire width of the trunk.

Since the spare wheel is usually stored in the floor of the trunk in the trunks of automobiles and the flat trunk floor is formed by a stiff floor covering such as a mat or panel that rests on the trunk floor and covers the spare wheel, according to an advantageous feature of preferred embodiment of the invention the at least one row of holes and the guide rail of the locking device are integrated into the floor covering. With the device fully folded against the back wall, the floor panel is exposed so that it can be lifted to access the spare wheel.

Other objects, advantages and novel features of the present invention will become apparent from the following detailed description of the invention when considered in conjunction with the accompanying drawings.

DETAILED DESCRIPTION OF THE DRAWINGS

Figure 1:
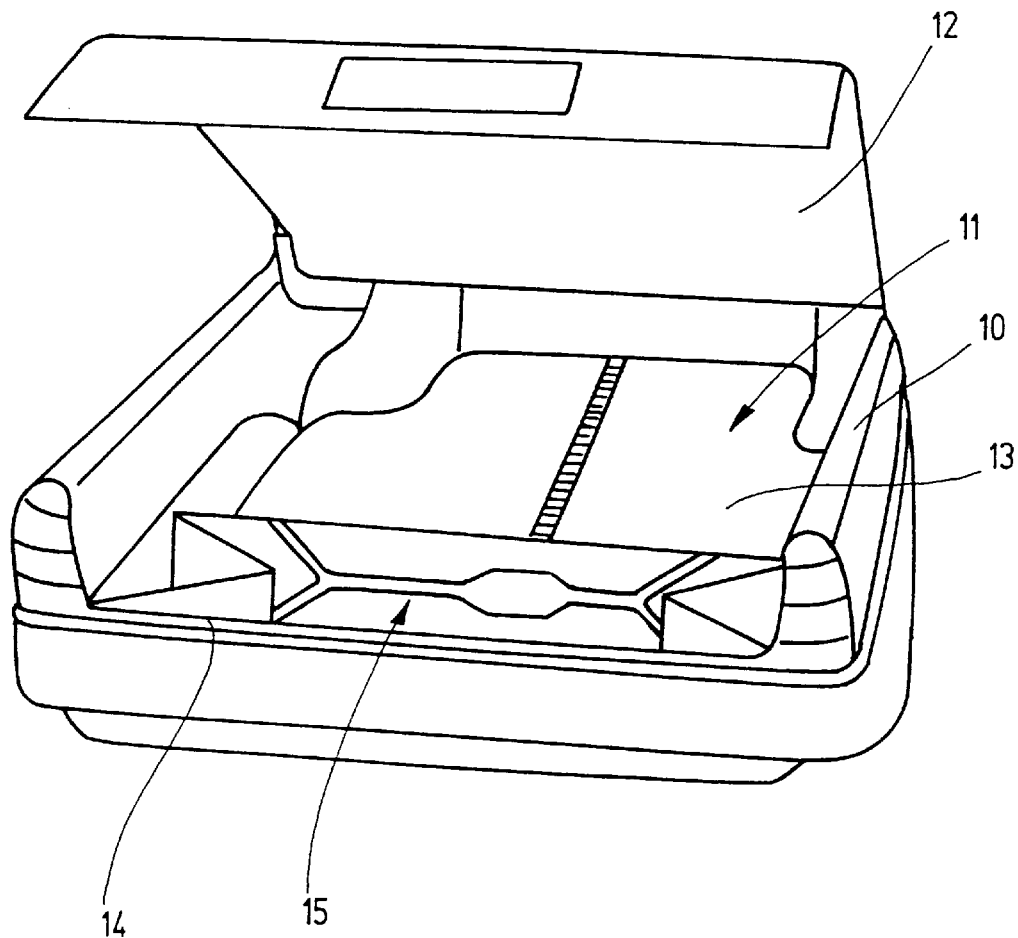
FIG. 1 is a perspective view of a rear of an automobile with a trunk that is accessible when the hatchback or trunk lid is opened, provided with a device for division of the trunk, constructed according to a preferred embodiment of the invention.

In FIG. 1, reference number 10 refers to the rear of an automobile in which a trunk 11 is located, said trunk being closable by a hatchback or trunk lid 12. Usually a depression is provided in the floor of trunk 11 to accommodate a spare wheel, said wheel being covered by a rigid floor covering 13 placed on the trunk floor, in the shape of a flat mat or panel. At trunk wall 14 that delimits the rear of trunk 11 or on a rear panel that covers this trunk wall 14 on the inside, a device 15 is mounted for variable subdivision of trunk 11. Device 15 makes available within trunk 11 a receiving space 16 with a variably adjustable area for inserting smaller objects and articles of luggage, so that these items are held within narrow limits and cannot roll around in large trunk 11 while the car is in motion.

Figure 2:
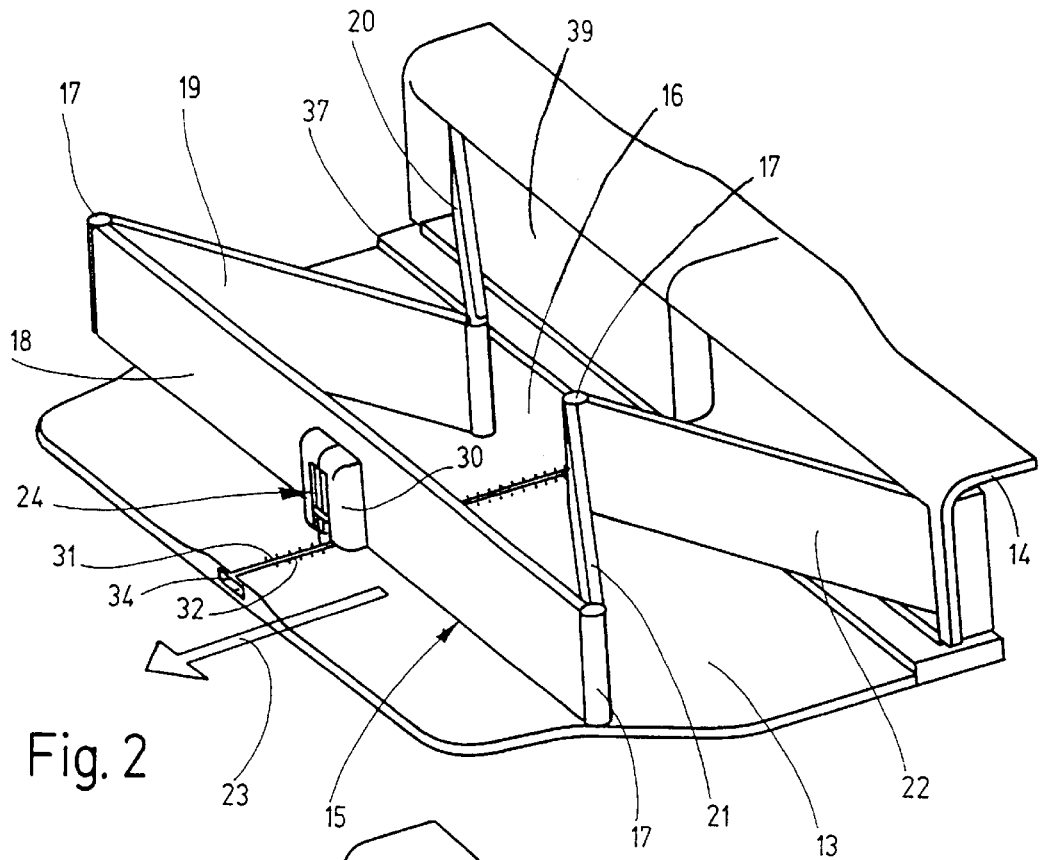
FIG. 2 is a perspective view of the device, partially unfolded, for variable division of the trunk in FIG. 1.

Device 15 is shown in a perspective view in FIG. 2. The parts associated with the vehicle that are shown include rear trunk wall 14 and flat floor covering 13. Device 15 in the embodiment shown has a total of five partitions connected with one another by hinge joints 17 and projecting vertically, of which the forward partition 18 facing away from rear trunk wall 14 extends parallel to rear trunk wall 14 and is fastened with articulation by two partitions 19, 20 and 21, 22, connected with one another with articulation, to rear wall 14 of the trunk. Partitions 20, 22 are likewise secured to rear wall 14 of the trunk by hinge joints with vertically aligned hinge axes. Instead of the two lateral partitions 19, 20 and 21, 22, a plurality of partitions connected with one another with articulation can also be provided, for example to increase the length of extension of device 15 in the direction of arrow 23 in FIG. 2 or to ensure that partitions 19–22 do not extend for the same distance into receiving space 16 when device 15 is in the partially extended state. Forward displaceable partition 18 preferably extends over the entire width of trunk 11 or floor covering 13 in trunk 11.

To secure front partition 18 in any desired position along its possible displacement path (arrow 23), a locking device 24 is provided between partition 18 and floor covering 13, said device including a manually operable lock 25 secured to partition 18 and a plurality of locking receptacles 26 arranged in a row in the displacement direction (arrow 23) in floor covering 13. As shown enlarged in FIG. 6, lock 25 in this case comprises two locking pins 27, 28 connected with one another by a handle 29 and displaceable vertically flexibly in a locking block 30 fastened to partition 18. As can be seen from FIGS. 2, 3, and 5, the plurality of latching receptacles 26 is made in the form of two rows of holes 31, 32 parallel to one another in floor covering 13, said rows of holes extending in the displacement direction of partition 18 with a transverse space between them (arrow 23), approximately centrally in floor covering 13. The individual latching holes 33 of the two rows of holes 31, 32 are so designed that they each receive the ends of locking pins 27, 28 shapewise. A guide rail 34 extends centrally between the two rows of holes 31, 32 in floor covering 13, said rail being machined integrally into floor covering 13 and having an approximately C-shaped hollow profile. A guide member 35 is located on the underside of latching block 30, said member projecting by a guide head 36 in the shape of a T in cross section (FIG. 4) into guide rail 34 and being guided therein with guiding play. Guide head 36 is inserted into the rail at the end of guide rail 34 facing rear trunk wall 14, and since the top of guide head 36 is gripped at left and right by the shoulders (40) of the C profile of guide rail 34, the head cannot be pulled upward out of guide rail 34 and partition 18 remains permanently anchored to floor covering 13 in the vertical direction.

Figure 3:
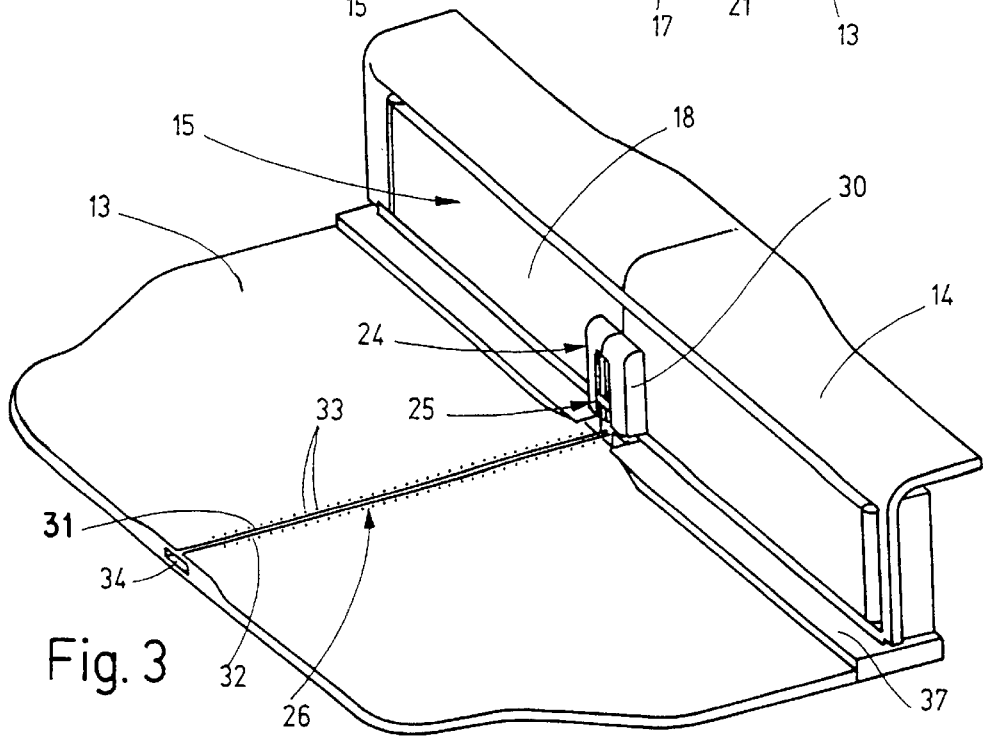
FIG. 3 is a view similar to FIG. 2 of the device when folded.
Figure 4:
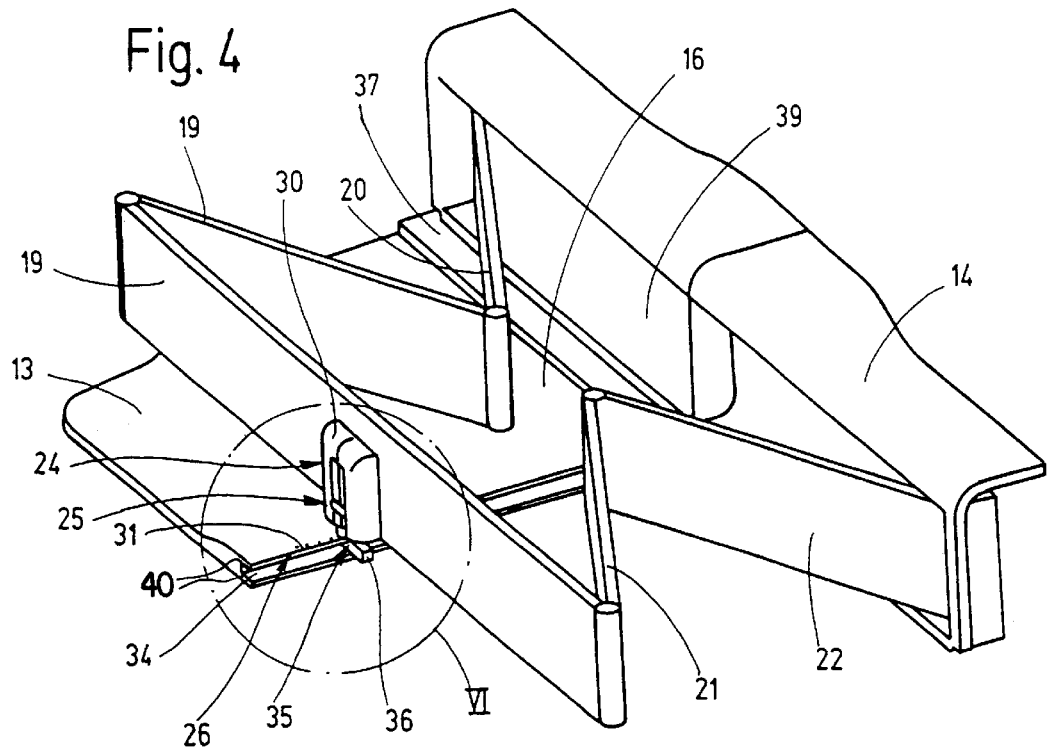
FIG. 4 is a view similar to FIG. 2 with the trunk floor covering halfway removed.
Figure 5:
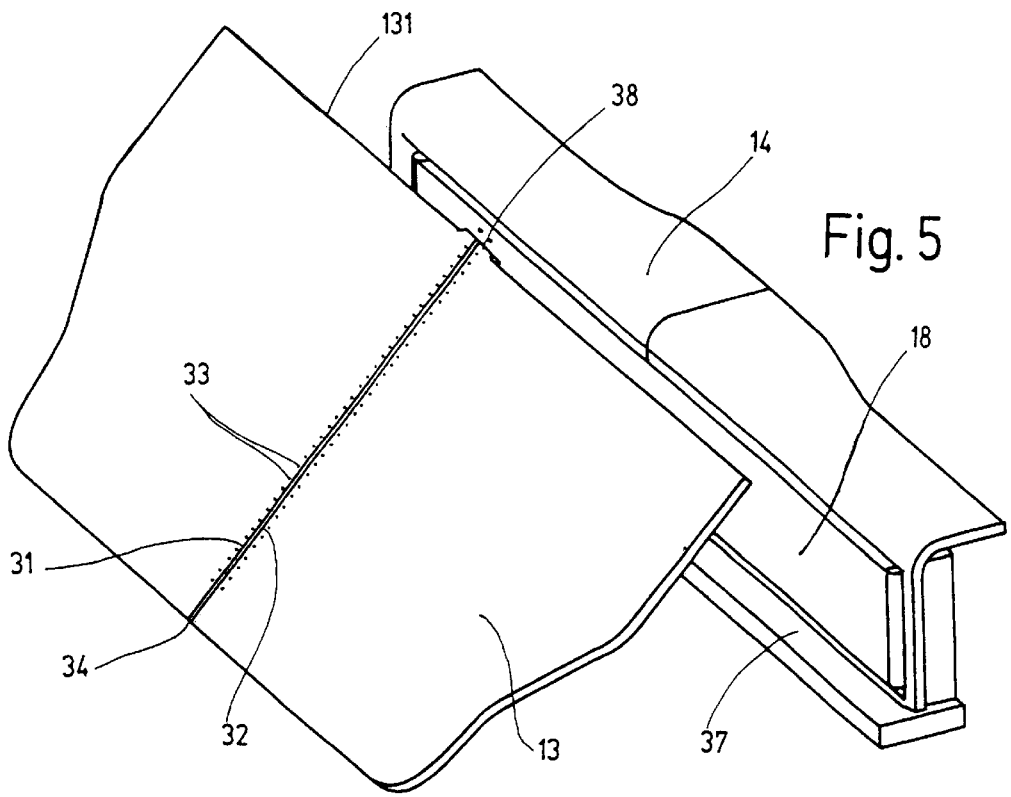
FIG. 5 is a perspective view of the device when folded and the trunk floor covering raised to access the spare wheel.
Figure 6:
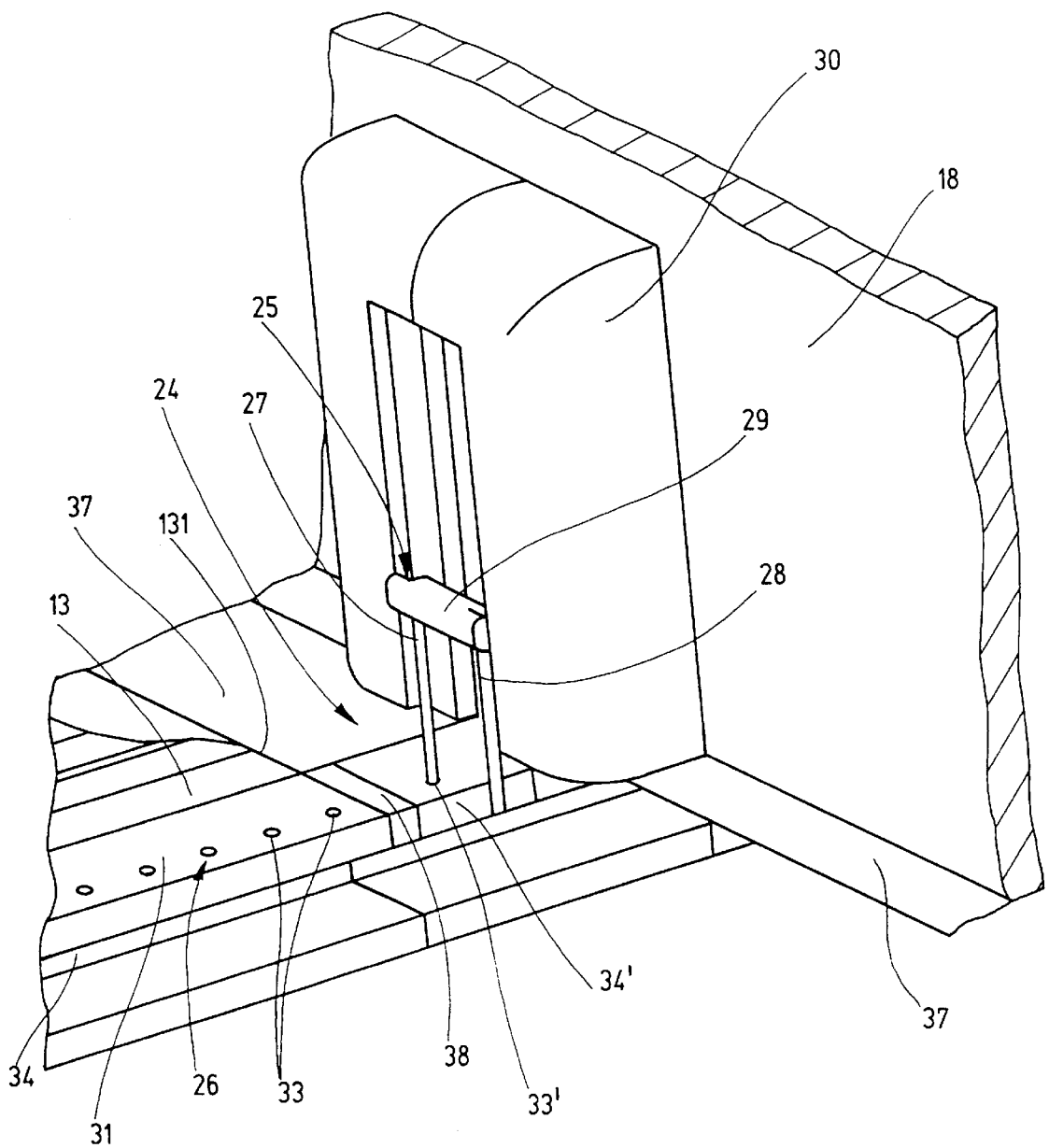
FIG. 6 is an enlarged view of section VI in FIG. 4.

FIG. 3 shows device 15 in its folded non-use position. In this case, all the partitions 18–22 abut one another and the entire partition packet is located in a depression 39 provided in rear trunk wall 14 (FIGS. 2 and 4) so that the front of the front partition 18 facing trunk 11 is flush with the rear wall 14 of the trunk. In this position, partition 18 can be locked by means of locking device 24 to a sill 37 that is integral with the trunk floor, in which sill a narrow end portion 34' separate from guide rail 34 and two locking holes 33' separate from hole rows 31, 32 are provided (FIG. 6). Floor covering 13 abuts sill 37 with its front edge 131 and can be removed from trunk 11 in this position to provide access to the spare wheel, as shown in FIG. 5. In order for guide member 35 with its guide head 36 to be able to travel from narrow end portion 34' endwise into guide rail 34 in floor covering 13 after reinserting floor covering 13 in trunk 11, centering insert 38 (FIGS. 5 and 6) is provided between front edge 131 of floor covering 13 and sill 37, said centering ensuring alignment of floor covering 13 such that narrow end portion 34' in sill 37 is flush with guide rail 34 in floor covering 13. Device 15, which is folded in its non-use position as shown in FIG. 3, provides full access to trunk 11 and does not prevent or interfere with its complete use.

If a smaller number of loose objects or articles of luggage are to be secured from rolling around in spacious trunk 11, handle 29 is pulled upward until the two locking pins 27, 28 come free of the two locking holes 33' in sill 37. Then partition 18 is pulled away from rear wall 14 of the trunk in the direction of arrow 23 in FIG. 2, whereupon partitions 19–22 gradually fold apart and free up receiving space 16 (FIGS. 2 and 4). In the desired extended position of device 15, handle 29 is again moved downward so that locking pins 27, 28 drop into two locking holes 33 in the two hole rows 31, 32 and secure partition 18 nondisplaceably to floor covering 13. To prevent inadvertent sliding of locking pins 27, 28 out of hole rows 31, 32, a compression spring can engage handle 29, said spring urging handle 29 vertically downward and thus keeping locking pins 27, 28 engaged in locking holes 33.

Device 15 according to the invention for subdividing trunk 11 is not limited to use in a trunk 11 of an automobile. Rather, device 15 can be used in any storage or cargo spaces of transport vehicles.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. Device for variable subdivision of a storage compartment, especially a trunk in an automobile, with partitions projecting from the floor of the storage compartment and connected with one another with articulation, with two of said partitions being articulated at their free ends to a wall of the storage compartment that projects vertically upward from a floor of the storage compartment and with another of said partitions being displaceable from the wall of the storage compartment, wherein a locking device is provided in order to lock the displaceable partition to the floor of the storage compartment, said locking device having a manually operable lock mounted on the displaceable partition and a plurality of locking receptacles arranged in a row in the storage compartment floor.

2. Device according to claim 1, wherein the lock has at least one locking pin and the plurality of locking receptacles has at least one row of holes which can be engaged by the locking pin, said row of holes traversing a central portion of the storage compartment floor.

3. Device according to claim 2, wherein a guide rail is provided in the storage compartment floor, said rail extending parallel to at least one row of holes, and wherein a guide member that fits into the guide rail is provided on the displaceable partition.

4. Device according to claim 3, wherein the guide rail has at least one shoulder extending in the lengthwise direction and projecting transversely thereto, said shoulder fitting at least partially over the guide member on its top that faces away from the storage compartment floor with guiding play.

5. Device according to claim 1, wherein at least two partitions connected together with articulation are provided between each lateral end of the displaceable partition and the wall of the storage compartment.

6. Device according to claim 2, wherein at least two partitions connected together with articulation are provided between each lateral end of the displaceable partition and the wall of the storage compartment.

7. Device according to claim 3, wherein at least two partitions connected together with articulation are provided between each lateral end of the displaceable partition and the wall of the storage compartment.

8. Device according to claim 1, wherein the articulated connections between the partitions are formed by hinge joints with hinge axis aligned approximately at right angles to the storage compartment floor.

9. Device according to claim 2, wherein the articulated connections between the partitions are formed by hinge joints with hinge axis aligned approximately at right angles to the storage compartment floor.

10. Device according to claim 5, wherein the articulated connections between the partitions are formed by hinge joints with hinge axis aligned approximately at right angles to the storage compartment floor.

11. Device according to claim 3, wherein the vertically projecting storage compartment wall is formed by a rear trunk wall or a rear panel of an automobile covering said trunk wall, and wherein the displaceable partition extends parallel to the sides of the trunk and preferably over the entire width of the trunk.

12. Device according to claim 11, wherein a rigid floor covering is provided on a trunk floor and at least one row of holes and guide rail are integrated into the floor covering.

13. Device according to claim 12, wherein the floor covering is designed so that it can be removed from the trunk floor and wherein at least one centering insert is provided between a trunk floor sill and floor covering.

14. Device according to claim 13, wherein the floor covering terminates at a distance from rear trunk wall such that it can be raised when partitions are folded up against one another and stored against the rear trunk wall.

15. Device according to claim 11, wherein the lock has two locking pins fastened to a handle that is displaceable vertically on the displaceable partition, and wherein two rows of holes run parallel to the guide rail and are provided in the floor covering.

16. Device according to claim 14, wherein the lock has two locking pins fastened to a handle that is displaceable vertically on the displaceable partition, and wherein two rows of holes run parallel to the guide rail and are provided in the floor covering.

17. Device according to claim 15, wherein the guide rail is machined integrally with a C-shaped hollow profile into the floor covering, and wherein a guide member slides in the hollow profile by a guide head that projects beyond the lower edge of the displaceable partition and is T-shaped in cross section.

18. A vehicle trunk storage compartment divider assembly for a compartment having a laterally extending vertically upright wall and a horizontally extending floor covering, said divider assembly comprising:

a first divider wall which in use is displaceable with respect to the upright wall, a plurality of further divider walls articulated between the first divider wall and the upright wall, and a locking device mounted on the first divider wall and operable to selectively vertically lock the first divider wall to a plurality of locking receptacles arranged in a row on the floor covering.

19. A vehicle trunk storage compartment divider assembly according to claim 18, wherein the locking device includes a vertically movable locking member which can engage a plurality of locking receptacles in the floor covering.

20. A vehicle trunk storage compartment divider assembly according to claim 19, wherein the floor covering includes a guide rail and the locking device includes a guide member slidably disposable in said guide rail.

* * * * *